(12) United States Patent
Mishra et al.

(10) Patent No.: US 12,361,021 B1
(45) Date of Patent: Jul. 15, 2025

(54) SYSTEM AND METHOD FOR SEPARATING OR DISTRIBUTING DATABASE CALLS BETWEEN ACTIVE AND PASSIVE DATABASES

(71) Applicant: JPMorgan Chase Bank, N.A., New York, NY (US)

(72) Inventors: Jagdish Mishra, Mumbai (IN); Garima Dokania, Mumbai (IN); Anil Gupta, Chicago, IL (US); Nirav Mehta, Mumbai (IN); Umesh Payyan Valappil, Mumbai (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/590,545

(22) Filed: Feb. 28, 2024

(30) Foreign Application Priority Data

Jan. 15, 2024 (IN) .............................. 202411002892

(51) Int. Cl.
   *G06F 7/00* (2006.01)
   *G06F 16/21* (2019.01)
   *G06F 16/27* (2019.01)

(52) U.S. Cl.
   CPC .......... *G06F 16/273* (2019.01); *G06F 16/214* (2019.01); *G06F 16/217* (2019.01)

(58) Field of Classification Search
   CPC ..... G06F 16/273; G06F 16/217; G06F 16/214
   USPC .................................................. 707/600–899
   See application file for complete search history.

(56) References Cited

U.S. PATENT DOCUMENTS

2022/0164266 A1* 5/2022 Butucea Panait ..... G06F 16/273

* cited by examiner

*Primary Examiner* — Isaac M Woo
(74) *Attorney, Agent, or Firm* — GREENBLUM & BERNSTEIN, P.L.C.

(57) ABSTRACT

Various methods and processes, apparatuses/systems, and media for separating or distributing database calls between active and passive databases are disclosed. A processor establishes a communication link between a passive database and an active database via a communication network; executes real-time syncing of data between the active database and the passive database by implementing a replication algorithm; receives a request from an application user to generate a report corresponding to the application; implements a batch processor, at an application level, to separate read-only operations from read and write operations associated the application; and separates or distributes database calls, at the application level, between the active database and the passive database in a manner such that the read-only operations are directed to the passive database and the read and write operations are directed to the active database.

20 Claims, 7 Drawing Sheets

SYSTEM AND METHOD FOR SEPARATING OR DISTRIBUTING DATABASE CALLS BETWEEN ACTIVE AND PASSIVE DATABASES

CROSS-REFERENCE TO RELATED APPLICATIONS

This application claims the benefit of priority from Indian Provisional Patent Application No. 202411002892, filed Jan. 15, 2024, which is herein incorporated by reference in its entirety.

TECHNICAL FIELD

This disclosure generally relates to data processing, and, more particularly, to methods and apparatuses for implementing a platform, language, cloud, and database agnostic database calls distributing module configured to separate or distribute database calls between read write (active) and read only (passive) databases for better performance and client experience.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Various forms of databases are used today to store data, applications, and other information that are important for running an organization. For example, databases typically store aggregations of data records or files that contain information, such as sales transactions, customer data, financials and product information data. Databases are used for storing, maintaining, and accessing any sort of data. An active database is a database where both read and write operations may be performed. A passive database is a database where only ready operations may be performed. Typically, passive databases are utilized for disaster recovery.

Many heavy processing applications face issues or concerns during storage to a database, which directly or indirectly take a huge toll on stability of the system, performance, more scalable, client experience, business growth and profitability. Conventional tools fail to manage, corresponding to the applications, all read and write operations and fail to segregate all complex parts to the passive database thereby increasing loads on active database further deteriorating performance.

SUMMARY

The present disclosure, through one or more of its various aspects, embodiments, and/or specific features or sub-components, provides, among other features, various systems, servers, devices, methods, media, programs, and platforms for implementing a platform, language, cloud, and database agnostic database calls distributing module configured to separate or distribute database calls between read write (active) and read only (passive) databases for better performance and client experience, but the disclosure is not limited thereto.

For example, the present disclosure, through one or more of its various aspects, embodiments, and/or specific features or sub-components, provides, among other features, various systems, servers, devices, methods, media, programs, and platforms for implementing a platform, language, cloud, and database agnostic database calls distributing module configured to provide the following technical improvements: results in better performance, as load of database will be segregated; active database connections would be available to cater synchronous client request; resource usability; cost optimization, if the application is heavily used and going to expand in near future, from data point of view workload separation can be applied which can save cost from procuring a new server, but the disclosure is not limited thereto. Moreover, the database calls distributing module is platform agnostic, and therefore, may easily be applied to any platform, be it an on premises visual system integrator, private or public cloud.

According to exemplary embodiments, a method for separating or distributing database calls between active and passive databases by utilizing one or more processors along with allocated memory is disclosed. The method may include: establishing a communication link between a passive database and an active database via a communication network; executing real-time syncing of data between the active database and the passive database by implementing a replication algorithm; receiving a request from an application user to generate a report corresponding to the application; implementing a batch processor, at an application level, to separate read-only operations from read and write operations associated the application; and separating or distributing database calls, at the application level, between the active database and the passive database in a manner such that the read-only operations are directed to the passive database and the read and write operations are directed to the active database in order to reduce load on the active database to generate the report.

According to exemplary embodiments, the method may further include: creating a disaster recovery pair global load balancer for a new data source to enable the passive database to act as an intrusion prevention system for accessing read only operations; and establishing connection for the new data source in the passive database.

According to exemplary embodiments, the method may further include: adding, at the application level, a new database connectivity uniform resource locator and database user functional identifiers to application properties.

According to exemplary embodiments, the method may further include: configuring the new database connectivity uniform resource locator at the application level; and configuring the new data source at the application level for the read-only operations.

According to exemplary embodiments, the method may further include: creating the active database as a primary database in an availability zone; and creating the passive database as a read replica database in the same availability zone.

According to exemplary embodiments, the method may further include: creating the active database as a primary database in a first availability zone; and creating the passive database as a read replica database in a second availability zone different from the first availability zone.

According to exemplary embodiments, in implementing the replication algorithm, the method may further include: loading, distributing, and filtering transactions associated with the application in real-time; and enabling migrations of data between the active database and the passive database in real-time.

According to exemplary embodiments, a system for separating or distributing database calls between active and passive databases is disclosed. The system may include: a processor; and a memory operatively connected to the processor via a communication interface, the memory storing computer readable instructions, when executed, may cause the processor to: establish a communication link between a passive database and an active database via a communication network; execute real-time syncing of data between the active database and the passive database by implementing a replication algorithm; receive a request from an application user to generate a report corresponding to the application; implement a batch processor, at an application level, to separate read-only operations from read and write operations associated the application; and separate or distribute database calls, at the application level, between the active database and the passive database in a manner such that the read-only operations are directed to the passive database and the read and write operations are directed to the active database in order to reduce load on the active database to generate the report.

According to exemplary embodiments, the processor may be further configured to: create a disaster recovery pair global load balancer for a new data source to enable the passive database to act as an intrusion prevention system for accessing read only operations; and establish connection for the new data source in the passive database.

According to exemplary embodiments, the processor may be further configured to: add, at the application level, a new database connectivity uniform resource locator and database user functional identifiers to application properties.

According to exemplary embodiments, the processor may be further configured to: configure the new database connectivity uniform resource locator at the application level; and configure the new data source at the application level for the read-only operations.

According to exemplary embodiments, the processor may be further configured to: create the active database as a primary database in an availability zone; and create the passive database as a read replica database in the same availability zone.

According to exemplary embodiments, the processor may be further configured to: create the active database as a primary database in a first availability zone; and create the passive database as a read replica database in a second availability zone different from the first availability zone.

According to exemplary embodiments, in implementing the replication algorithm, the processor may be further configured to: load, distribute, and filter transactions associated with the application in real-time; and enable migrations of data between the active database and the passive database in real-time.

According to exemplary embodiments, a non-transitory computer readable medium configured to store instructions for separating or distributing database calls between active and passive databases is disclosed. The instructions, when executed, may cause a processor to perform the following: establishing a communication link between a passive database and an active database via a communication network; executing real-time syncing of data between the active database and the passive database by implementing a replication algorithm; receiving a request from an application user to generate a report corresponding to the application; implementing a batch processor, at an application level, to separate read-only operations from read and write operations associated the application; and separating or distributing database calls, at the application level, between the active database and the passive database in a manner such that the read-only operations are directed to the passive database and the read and write operations are directed to the active database in order to reduce load on the active database to generate the report.

According to exemplary embodiments, the instructions, when executed, may cause the processor to further perform the following: creating a disaster recovery pair global load balancer for a new data source to enable the passive database to act as an intrusion prevention system for accessing read only operations; and establishing connection for the new data source in the passive database.

According to exemplary embodiments, the instructions, when executed, may cause the processor to further perform the following: adding, at the application level, a new database connectivity uniform resource locator and database user functional identifiers to application properties.

According to exemplary embodiments, the instructions, when executed, may cause the processor to further perform the following: configuring the new database connectivity uniform resource locator at the application level; and configuring the new data source at the application level for the read-only operations.

According to exemplary embodiments, the instructions, when executed, may cause the processor to further perform the following: creating the active database as a primary database in an availability zone; and creating the passive database as a read replica database in the same availability zone.

According to exemplary embodiments, the instructions, when executed, may cause the processor to further perform the following: creating the active database as a primary database in a first availability zone; and creating the passive database as a read replica database in a second availability zone different from the first availability zone.

According to exemplary embodiments, in implementing the replication algorithm, the instructions, when executed, may cause the processor to further perform the following: loading, distributing, and filtering transactions associated with the application in real-time; and enabling migrations of data between the active database and the passive database in real-time.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
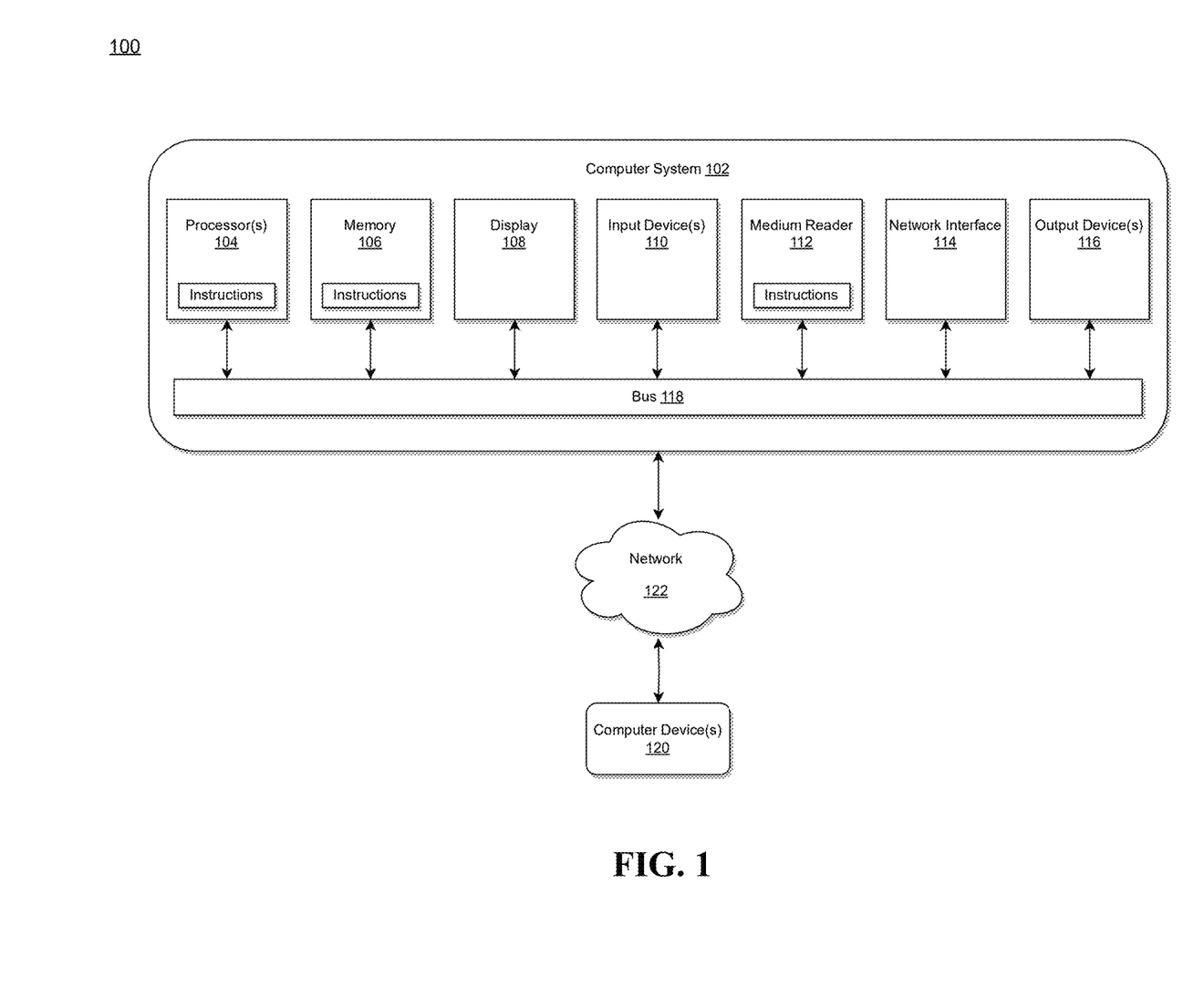
FIG. 1 illustrates a computer system for implementing a platform, language, database, and cloud agnostic database calls distributing module configured to separate or distribute database calls between read write (active) and read only (passive) databases for better performance and client experience in accordance with an exemplary embodiment.

FIG. 1 is an exemplary system 100 for use in implementing a platform, language, database, and cloud agnostic database calls distributing module configured to separate or distribute database calls between read write (active) and read only (passive) databases for better performance and client experience in accordance with an exemplary embodiment. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the database calls distributing module implemented by the system 100 may be platform, language, database, and cloud agnostic that may allow for consistent easy orchestration and passing of data through various components to output a desired result regardless of platform, browser, language, database, and cloud environment. Since the disclosed process, according to exemplary embodiments, is platform, language, database, browser, and cloud agnostic, the database calls distributing module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
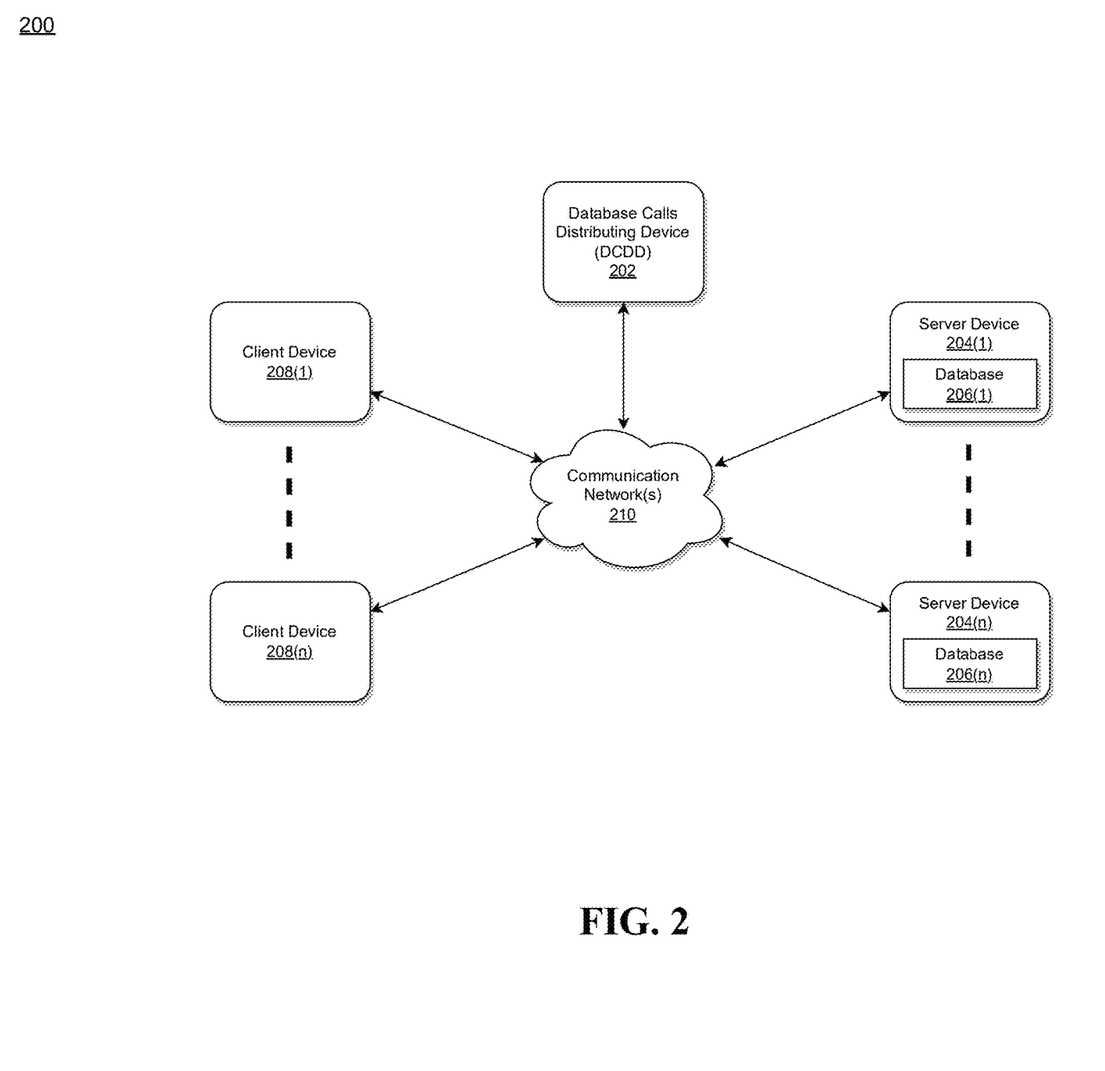
FIG. 2 illustrates an exemplary diagram of a network environment with a platform, language, database, and cloud agnostic database calls distributing device in accordance with an exemplary embodiment.

Referring to FIG. 2, a schematic of an exemplary network environment 200 for implementing a language, platform, database, and cloud agnostic database calls distributing device (DCDD) of the instant disclosure is illustrated.

According to exemplary embodiments, the above-described problems associated with conventional tools may be overcome by implementing a DCDD 202 as illustrated in FIG. 2 that may be configured for implementing a platform, language, database, and cloud agnostic database calls distributing module configured to separate or distribute database calls between read write (active) and read only (passive) databases for better performance and client experience, but the disclosure is not limited thereto.

The DCDD 202 may have one or more computer system 102s, as described with respect to FIG. 1, which in aggregate provide the necessary functions.

The DCDD 202 may store one or more applications that can include executable instructions that, when executed by the DCDD 202, cause the DCDD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DCDD 202 itself, may be located in virtual server(s) running in a cloud-based computing environment rather than being tied to one or more specific physical network computing devices. Also, the application(s) may be running in one or more virtual machines (VMs) executing on the DCDD 202. Additionally, in one or more embodiments of this technology, virtual machine(s) running on the DCDD 202 may be managed or supervised by a hypervisor.

In the network environment 200 of FIG. 2, the DCDD 202 is coupled to a plurality of server devices 204(1)-204(n) that hosts a plurality of databases 206(1)-206(n), and also to a plurality of client devices 208(1)-208(n) via communication network(s) 210. A communication interface of the DCDD 202, such as the network interface 114 of the computer system 102 of FIG. 1, operatively couples and communicates between the DCDD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DCDD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DCDD 202 may be a standalone device or integrated with one or more other devices or apparatuses, such as one or more of the server devices 204(1)-204(n), for example. In one particular example, the DCDD 202 may be hosted by one of the server devices 204(1)-204(n), and other arrangements are also possible. Moreover, one or more of the devices of the DCDD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DCDD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the DCDD 202 that may efficiently provide a platform for implementing a platform, language, database, and cloud agnostic database calls distributing module configured to separate or distribute database calls between read write (active) and read only (passive) databases for better performance and client experience, but the disclosure is not limited thereto.

The client devices 208(1)-208(n) may run interface applications, such as standard web browsers or standalone client applications, which may provide an interface to communicate with the DCDD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DCDD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the DCDD 202, the server devices 204(1)-204(n), or the client devices 208(1)-208(n), for example, may be configured to operate as virtual instances on the same physical machine. For example, one or more of the DCDD 202, the server devices 204(1)-204(n), or the client devices 208(1)-208(n) may operate on the same physical device rather than as separate devices communicating through communication network(s) 210. Additionally, there may be more or fewer DCDDs 202, server devices 204(1)-204(n), or client devices 208(1)-208(n) than illustrated in FIG. 2. According to exemplary embodiments, the DCDD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
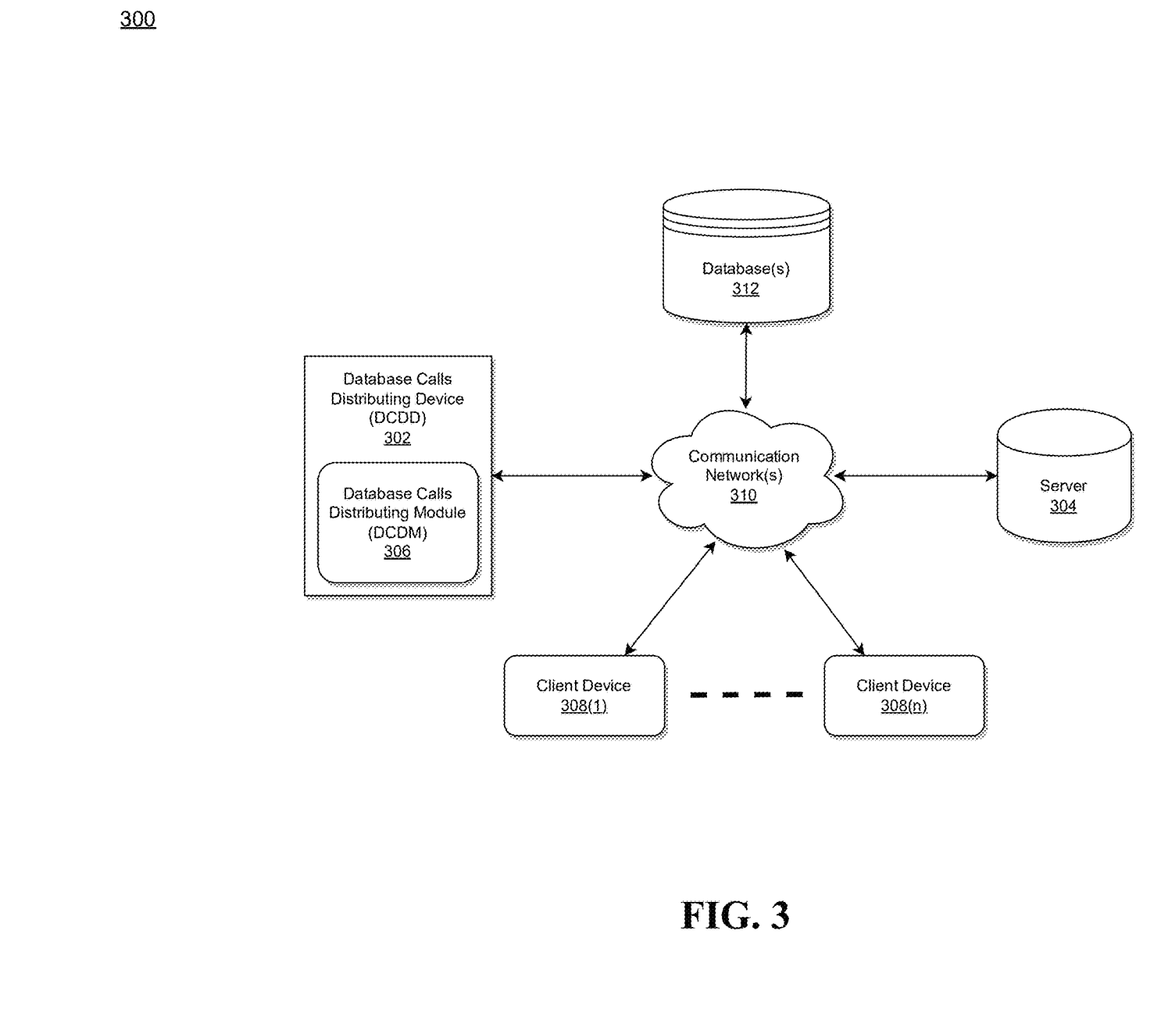
FIG. 3 illustrates a system diagram for implementing a platform, language, database, and cloud agnostic database calls distributing device having a platform, language, database, and cloud agnostic database calls distributing module in accordance with an exemplary embodiment.

FIG. 3 illustrates a system diagram for implementing a platform, language, and cloud agnostic DCDD having a platform, language, database, and cloud agnostic database calls distributing module (DCDM) in accordance with an exemplary embodiment.

As illustrated in FIG. 3, the system 300 may include a DCDD 302 within which a DCDM 306 is embedded, a server 304, a database(s) 312, a plurality of client devices 308(1) . . . 308(n), and a communication network 310.

According to exemplary embodiments, the DCDD 302 including the DCDM 306 may be connected to the server 304, and the database(s) 312 via the communication network 310. The DCDD 302 may also be connected to the plurality of client devices 308(1) . . . 308(n) via the communication network 310, but the disclosure is not limited thereto. The database(s) 312 may include rule database.

According to exemplary embodiment, the DCDD 302 is described and shown in FIG. 3 as including the DCDM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) 312 may be a mainframe database, a log database that may produce programming for searching, monitoring, and analyzing machine-generated data via a web interface, etc., but the disclosure is not limited thereto. In addition, the database(s) 312 may store the large code bases models as directed graphs and graph metrics and graph centrality measures.

According to exemplary embodiments, the DCDM 306 may be configured to receive real-time (i.e., within two milliseconds, but the disclosure is not limited thereto) feed of data from the plurality of client devices 308(1) . . . 308(n) and secondary sources via the communication network 310.

As may be described below, the DCDM 306 may be configured to: establish a communication link between a passive database and an active database via a communication network; execute real-time syncing of data between the active database and the passive database by implementing a replication algorithm; receive a request from an application user to generate a report corresponding to the application; implement a batch processor, at an application level, to separate read-only operations from read and write operations associated the application; and separate or distribute database calls, at the application level, between the active database and the passive database in a manner such that the read-only operations are directed to the passive database and the read and write operations are directed to the active database in order to reduce load on the active database to generate the report, but the disclosure is not limited thereto.

The plurality of client devices 308(1) . . . 308(n) are illustrated as being in communication with the DCDD 302. In this regard, the plurality of client devices 308(1) . . . 308(n) may be "clients" (e.g., customers) of the DCDD 302 and are described herein as such. Nevertheless, it is to be known and understood that the plurality of client devices 308(1) . . . 308(n) need not necessarily be "clients" of the DCDD 302, or any entity described in association therewith herein. Any additional or alternative relationship may exist between either or both of the plurality of client devices 308(1) . . . 308(n) and the DCDD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the DCDD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The DCDD 302 may be the same or similar to the DCDD 202 as described with respect to FIG. 2, including any features or combination of features described with respect thereto.

Figure 4:
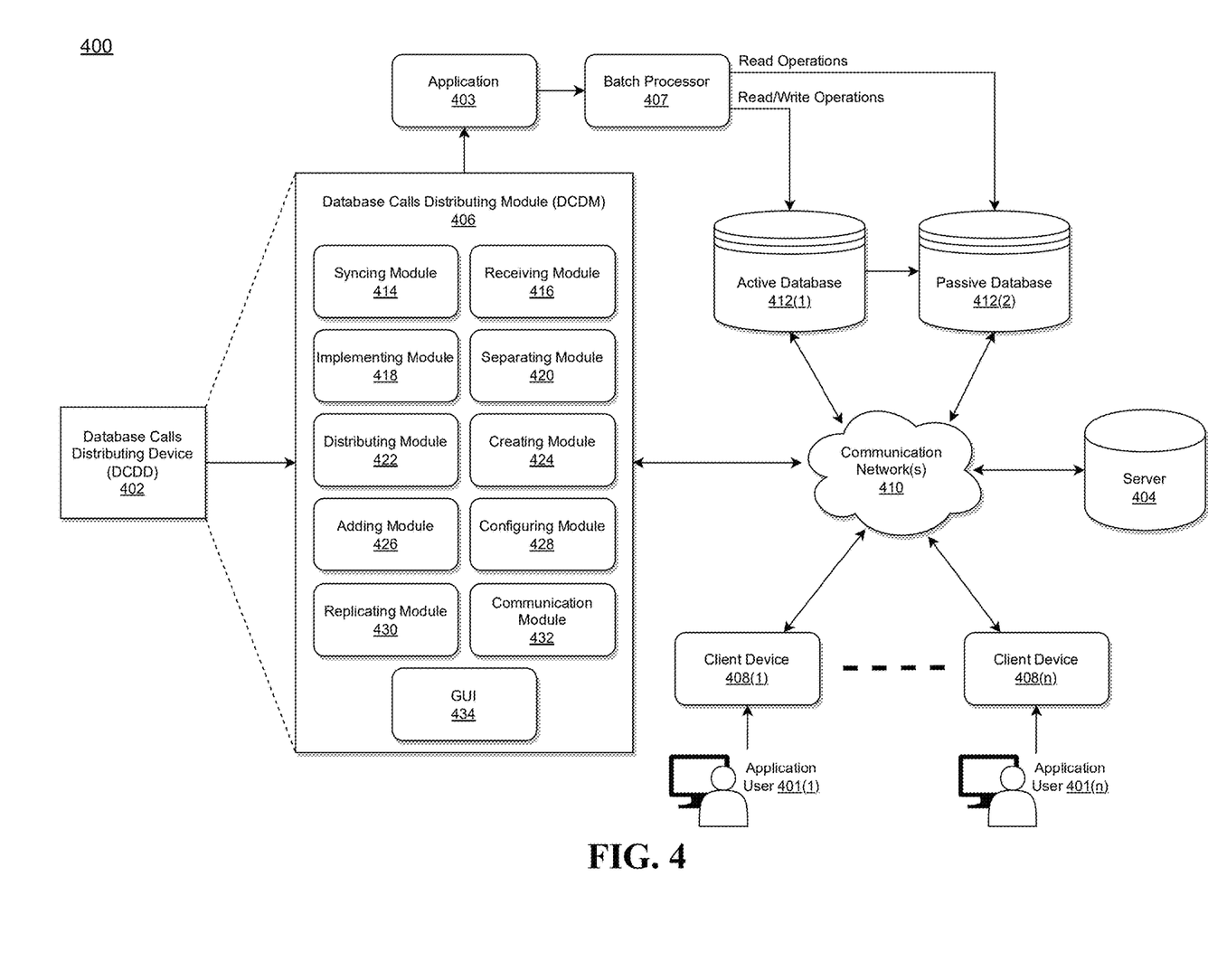
FIG. 4 illustrates a system diagram for implementing a platform, language, database, and cloud agnostic database calls distributing module of FIG. 3 in accordance with an exemplary embodiment.

FIG. 4 illustrates a system diagram for implementing a platform, language, database, and cloud agnostic DCDM of FIG. 3 in accordance with an exemplary embodiment.

According to exemplary embodiments, the system 400 may include a platform, language, database, and cloud agnostic DCDD 402 within which a platform, language, database, and cloud agnostic DCDM 406 is embedded, an application 403, a server 404, a batch processor 407, an active database 412(1), a passive database 412(2), and a communication network 410. According to exemplary embodiments, server 404 may comprise a plurality of servers located centrally or located in different locations, but the disclosure is not limited thereto.

According to exemplary embodiments, the DCDD 402 including the DCDM 406 may be connected to the server 404, the application 403, the batch processor 407, the active database 412(1), and the passive database 412(2), via the communication network 410. The DCDD 402 may also be connected to the plurality of client devices 408(1)-408(n) via the communication network 410, but the disclosure is not limited thereto. Application user 401(1)-401(n) may utilize the application 403 using client devices 408(1)-408(n), respectively, via the communication network(s) 410. The DCDM 406, the server 404, the plurality of client devices 408(1)-408(n), the databases 412(1)-412(2), and the communication network 410 as illustrated in FIG. 4 may be the same or similar to the DCDM 306, the server 304, the plurality of client devices 308(1)-308(n), the database(s) 312, and the communication network 310, respectively, as illustrated in FIG. 3.

According to exemplary embodiments, the DCDM 406 may be configured to separate or distribute database calls between read write (active) database (i.e., active database 412(1)) and read only (passive) database (i.e., passive database 412(2)) for better performance and client experience, but the disclosure is not limited thereto.

For example, the DCDM 406 may be configured to provide the following technical improvements: results in better performance, as load of database will be segregated; active database connections would be available to cater synchronous client request; resource usability; cost optimization, if the application is heavily used and going to expand in near future, from data point of view workload separation can be applied which can save cost from procuring a new server, but the disclosure is not limited thereto. Moreover, the DCDM 406 is platform agnostic, and therefore, may easily be applied to any platform, be it an on premises visual system integrator, private or public cloud.

Figure 5:
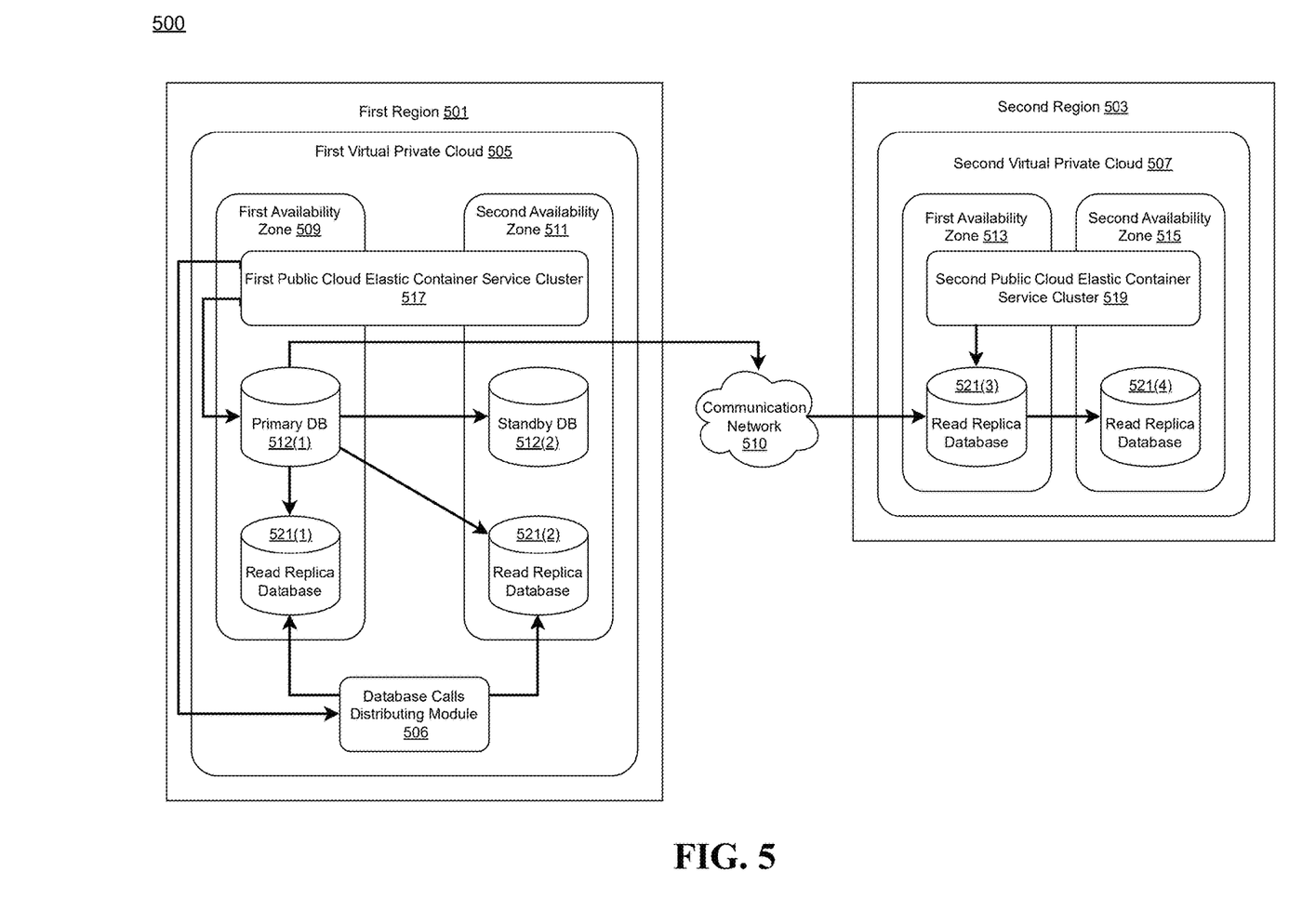
FIG. 5 illustrates an exemplary cloud architecture as implemented by the platform, language, database, and cloud agnostic database calls distributing module of FIG. 4 in accordance with an exemplary embodiment.
Figure 6:
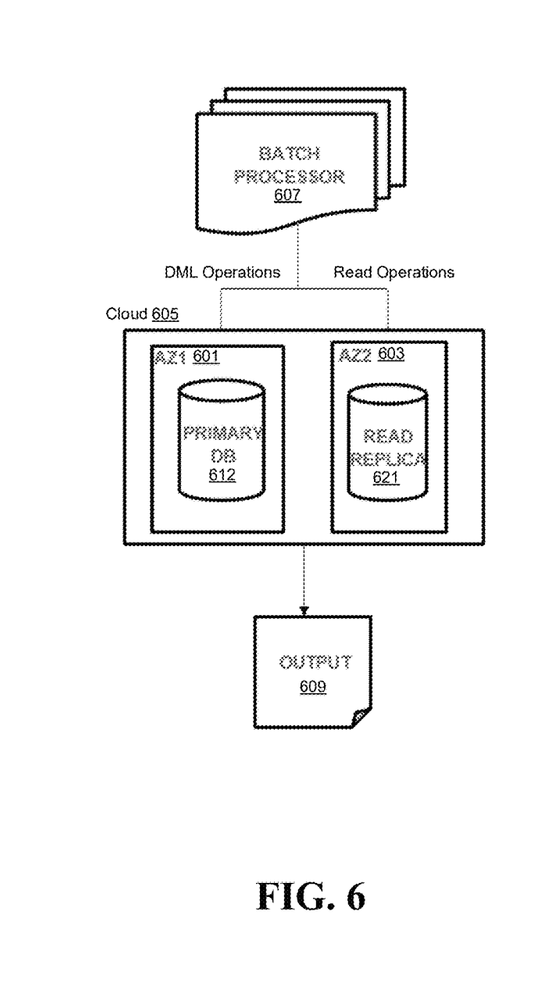
FIG. 6 illustrates an exemplary process for segregating between Data Manipulation Language (DML) calls and read only calls to database from application end in accordance with an exemplary embodiment.
Figure 7:
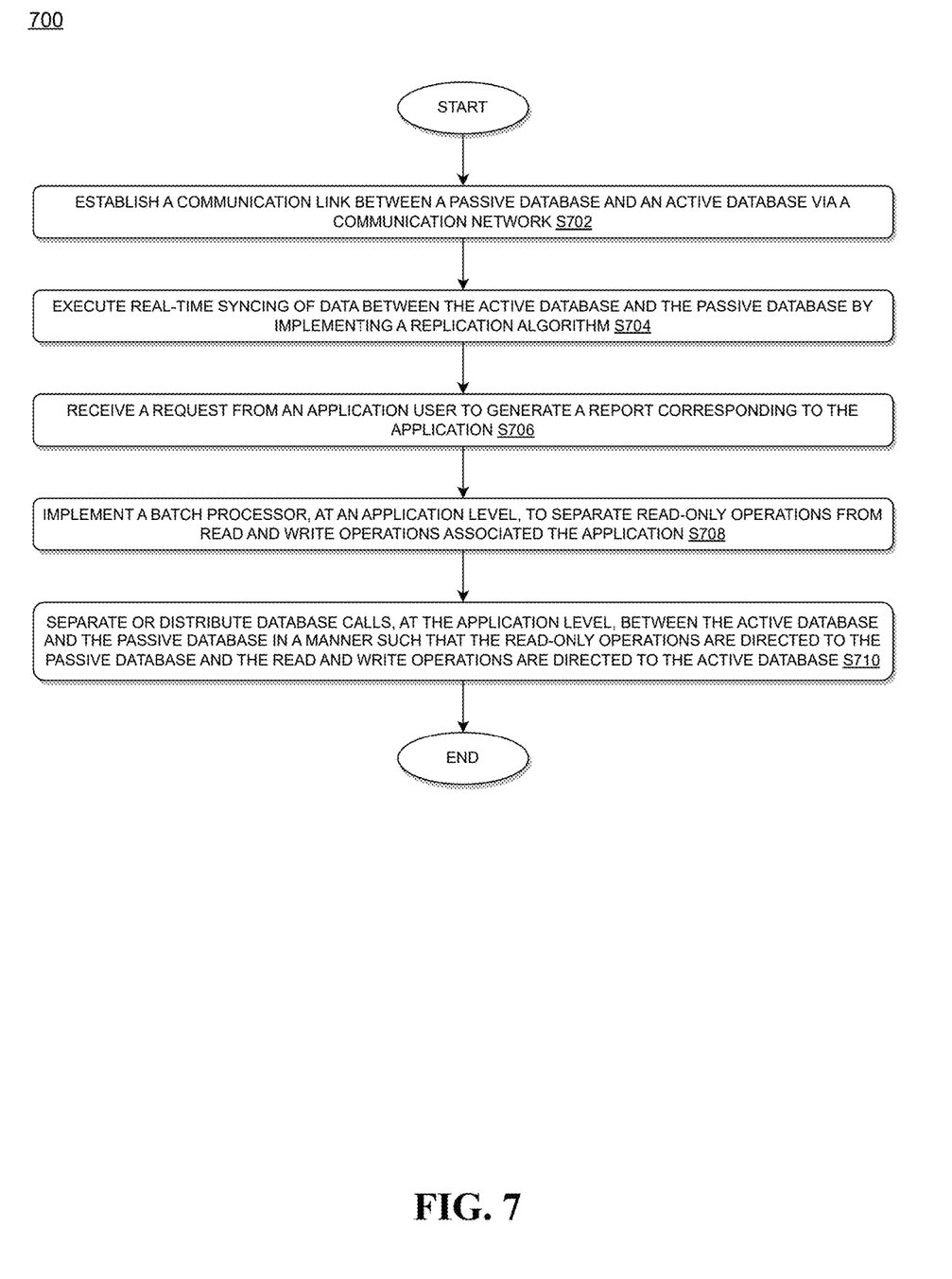
FIG. 7 illustrates an exemplary flow chart of a process implemented by the platform, language, database, and cloud agnostic database calls distributing module of FIG. 4 for separating or distributing database calls between read write (active) and read only (passive) databases for better performance and client experience in accordance with an exemplary embodiment.

Details of the DCDM 406 is provided below with corresponding modules that may be configured to, in combination, results in separating or distributing database calls between read write (active) database and read only (passive) database for better performance and client experience, as illustrated in FIGS. 5-7.

According to exemplary embodiments, as illustrated in FIG. 4, the DCDM 406 may include a syncing module 414, a receiving module 416, an implementing module 418, a separating module 420, a distributing module 422, a creating module 424, an adding module 426, a configuring module 428, a replicating module 430, a communication module 432 and a Graphical User Interface (GUI) 434. According to exemplary embodiments, interactions and data exchange among these modules included in the DCDM 406 provide the advantageous effects of the disclosed invention. Functionalities of each module of FIG. 4 may be described in detail below with reference to FIGS. 5-7.

According to exemplary embodiments, each of the syncing module 414, receiving module 416, implementing module 418, separating module 420, distributing module 422, creating module 424, adding module 426, configuring module 428, replicating module 430, and the communication module 432 of the DCDM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the syncing module 414, receiving module 416, implementing module 418, separating module 420, distributing module 422, creating module 424, adding module 426, configuring module 428, replicating module 430, and the communication module 432 of the DCDM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the syncing module 414, receiving module 416, implementing module 418, separating module 420, distributing module 422, creating module 424, adding module 426, configuring module 428, replicating module 430, and the communication module 432 of the DCDM 406 of FIG. 4 may be implemented by dedicated hardware, or as a combination of dedicated hardware to perform some functions and a processor (e.g., one or more programmed microprocessors and associated circuitry) to perform other functions, but the disclosure is not limited thereto. For example, the DCDM 406 of FIG. 4 may also be implemented by Cloud based deployment.

According to exemplary embodiments, each of the syncing module 414, receiving module 416, implementing module 418, separating module 420, distributing module 422, creating module 424, adding module 426, configuring module 428, replicating module 430, and the communication module 432 of the DCDM 406 of FIG. 4 may be called via corresponding API, but the disclosure is not limited thereto.

According to exemplary embodiments, the process implemented by the DCDM 406 may be executed via the communication module 432 and the communication network 410, which may comprise plural networks as described above. For example, in an exemplary embodiment, the various components of the DCDM 406 may communicate with the server 404, and the database(s) 412 via the communication module 432 and the communication network 410 and the results (i.e., reports corresponding to read operations and read/write operations) may be displayed onto the GUI 434. Of course, these embodiments are merely exemplary and are not limiting or exhaustive. The database(s) 412 may include the databases included within the private cloud and/or public cloud and the server 404 may include one or more servers within the private cloud and the public cloud.

According to exemplary embodiments, the communication module 432 may be configured to establish a communication link between the passive database 412(2) and the active database 412(1) via the communication network(s) 410. The syncing module 414 may be configured to execute real-time (i.e., within two milliseconds, but the disclosure is not limited thereto) syncing of data between the active database 412(1) and the passive database 412(2) by implementing a replication algorithm. For example, in implementing the replication algorithm, the replicating module 430 may be further configured to: load, distribute, and filter transactions associated with the application 403 in real-time; and enable migrations of data between the active database 412(1) and the passive database 412(2) in real-time. The replicating module 430 may implement data privacy and information security services or other replicating algorithms for real time synchronization of data between the active database 412(1) and the passive database 412(2).

According to exemplary embodiments, the receiving module 416 may be configured to receive a request from an application user 401(1)-401(n) to generate a report corresponding to the application 403. The implementing module 418 may be configured to implement a batch processor 407, at an application level, to separate read-only operations from read and write operations associated the application 403. The separating module 420 may be configured to separate and the distributing module 422 may be configured to distribute database calls, at the application level, between the active database 412(1) and the passive database 412(2) in a manner such that the read-only operations are directed to the passive database 412(2) and the read and write operations are directed to the active database 412(1) in order to reduce load on the active database 412(1) to generate a report. The report may be displayed onto the GUI 434.

According to exemplary embodiments, the creating module 424 may be further configured to create a disaster recovery pair global load balancer for a new data source to enable the passive database 412(2) to act as an intrusion prevention system for accessing read only operations. The communication module 432 may be configured to establish a connection for the new data source in the passive database 412(2). The intrusion prevention system is a network security tool (which can be a hardware device or software or a combination of hardware and software) that continuously monitors a network for malicious activity and takes action to prevent it, including reporting, blocking, or dropping it, when it does occur. Moreover, the DCDM 406 may be configured to ensure high availability, data protection, and disaster recovery for enterprise data; and survive disasters and data corruption while creating, maintaining, and managing one or more synchronized standby databases.

According to exemplary embodiments, the adding module 426 may be further configured to add, at the application level, a new database connectivity uniform resource locator and database user functional identifiers to application properties.

According to exemplary embodiments, the configuring module 428 may be further configured to configure the new database connectivity uniform resource locator at the application level; and configure the new data source at the application level for the read-only operations.

According to exemplary embodiments, the batch processor 407 may be configured to not only performing batch processing where the batch processor 407 runs a batch for a preconfigured time period, but may also implement data transformation logic, business calculation, data validation, data integration, etc., at this read-write operation layer, but the disclosure is not limited thereto.

According to exemplary embodiments, the creating module 424 may be further configured to create the active database 412(1) as a primary database in an availability zone; and create the passive database 412(2) as a read replica database in the same availability zone.

According to exemplary embodiments, the creating module 424 may be further configured to create the active database 412(1) as a primary database in a first availability zone; and create the passive database 412(2) as a read replica database in a second availability zone different from the first availability zone.

For example, FIG. 5 illustrates an exemplary cloud architecture 500 as implemented by the DCDM 406 of FIG. 4 in accordance with an exemplary embodiment.

As illustrated in FIG. 5, the exemplary cloud architecture 500 may include a first virtual private cloud (VPC) 505 implemented within a first region 501 and a second VPC 507 implemented within a second region 503. The creating module 424 may be further configured to create the active database 412(1) as a primary database in an availability zone; and create the passive database 412(2) as a read replica database in the same availability zone.

According to exemplary embodiments, the creating module 424 may be further configured to create a primary database (DB) 512(1) and a read replica DB 521(1) in a first availability zone 509 within the first VPC 505. The creating module 424 may be further configured to create a standby DB 512(2) and a read replica DB 521(2) in a second availability zone 511, different from the first availability zone 509 within the first VPC 505. A first cloud elastic container service (ECS) cluster 517 may be implemented between the first availability zone 509 and the second availability zone 511. The first cloud ECS 517 may be implemented for document management, rewards calculation, import assets, mobile support, batch mapper, data stage mapper, report generation, etc., but the disclosure is not limited thereto. Data from the first cloud ECS 517 may flow to the primary DB 512(1) and to the database calls distributing module 506.

According to exemplary embodiments, the database calls distributing module 506 may be configured to separate and distribute database calls to appropriate databases. For example, data from the primary DB 512(1) may flow to read replica DB 521(1) and the read replica DB 521(2) by following data guard logic, i.e., complete data protection and disaster recovery and automatic management of synchronized copies of the primary DB 512(1). Data from the primary DB 512(1) may also flow to the standby DB 512(2) by following a business logic that supports today's evolving business models, drives productivity, and meets the demands of the modern mobile user while gaining all benefits of the first VPC 505.

Alternatively, the creating module 424 may be further configured to create a read replica DB 521(3) in the first availability zone 513 within the second VPC 507 located in the second region 503. The creating module 424 may be further configured to create a read replica DB 521(4) in the second availability zone 515 different from the first availability zone 513 within the second VPC 507 located in the second region 503. According to this exemplary embodiment, data from the primary DB 512(1) located within the first region 501 may flow to the read replica DB 521(3) located within the second region 503 via the communication network 510. A second cloud ECS cluster 519 may be implemented between the first availability zone 513 and the second availability zone 515. The second cloud ECS 519 may be implemented for document management, rewards calculation, import assets, mobile support, batch mapper, data stage mapper, report generation, etc., but the disclosure is not limited thereto. Data from the second cloud ECS 519 may flow to the read replica DB 521(3) and data from the read replica DB 521(3) may flow to read replica database 521(4).

FIG. 6 illustrates an exemplary process 600 for segregating between Data Manipulation Language (DML) calls (i.e., read/write calls) and read only calls to database from application end in accordance with an exemplary embodiment. A DML is a computer programming language used for adding (inserting), deleting, and modifying (updating) data in a database.

For example, referring back to FIGS. 4-6, the creating module 424 may be configured to create a primary DB 612 in availability zone (AZ) 1 (i.e., element 601 as illustrated in FIG. 6) and create a read replica 621 in another availability AZ2 (i.e., element 603 as illustrated in FIG. 6). Both AZ1 and AZ2, according to exemplary embodiments are implemented within cloud 605, but the disclosure is not limited thereto. For example, as illustrated in FIG. 5, the primary DB 612 may be created in one region and the read replica of same may be created in another region. The replication module 430 may enable a replication algorithm to replicate data from the primary DB 612 to the read replica 621 in real-time. And the batch processor 607 may segregate between DML calls (i.e., read/write calls) and read only calls to corresponding database from application end in accordance with an exemplary embodiment, such as DML calls going to the primary DB 612 and read only operations to the read replica 621.

FIG. 7 illustrates an exemplary flow chart of a process 700 implemented by the platform, language, database, and cloud agnostic DCDM 407 of FIG. 4 for separating or distributing database calls between read write (active) and read only (passive) databases for better performance and client experience in accordance with an exemplary embodiment. It may be appreciated that the illustrated process 700 and associated steps may be performed in a different order, with illustrated steps omitted, with additional steps added, or with a combination of reordered, combined, omitted, or additional steps.

As illustrated in FIG. 7, at step S702, the process 700 may include establishing a communication link between a passive database and an active database via a communication network.

At step S704, the process 700 may include executing real-time syncing of data between the active database and the passive database by implementing a replication algorithm.

At step S706, the process 700 may include receiving a request from an application user to generate a report corresponding to the application.

At step S708, the process 700 may include implementing a batch processor, at an application level, to separate read-only operations from read and write operations associated the application.

At step S710, the process 700 may include separating or distributing database calls, at the application level, between the active database and the passive database in a manner such that the read-only operations are directed to the passive database and the read and write operations are directed to the active database in order to reduce load on the active database to generate the report.

According to exemplary embodiments, the process 700 may further include: creating a disaster recovery pair global load balancer for a new data source to enable the passive database to act as an intrusion prevention system for accessing read only operations; and establishing connection for the new data source in the passive database.

According to exemplary embodiments, the process 700 may further include: adding, at the application level, a new database connectivity uniform resource locator and database user functional identifiers to application properties.

According to exemplary embodiments, the process 700 may further include: configuring the new database connectivity uniform resource locator at the application level; and configuring the new data source at the application level for the read-only operations.

According to exemplary embodiments, the process 700 may further include: creating the active database as a primary database in an availability zone; and creating the passive database as a read replica database in the same availability zone.

According to exemplary embodiments, the process 700 may further include: creating the active database as a primary database in a first availability zone; and creating the passive database as a read replica database in a second availability zone different from the first availability zone.

According to exemplary embodiments, in implementing the replication algorithm, the process 700 may further include: loading, distributing, and filtering transactions associated with the application in real-time; and enabling migrations of data between the active database and the passive database in real-time.

According to exemplary embodiments, the DCDD 402 may include a memory (e.g., a memory 106 as illustrated in FIG. 1) which may be a non-transitory computer readable medium that may be configured to store instructions for implementing a platform, language, database, and cloud agnostic DCDM 406 for automatically and dynamically separating or distributing database calls between active and passive databases as disclosed herein. The DCDD 402 may also include a medium reader (e.g., a medium reader 112 as illustrated in FIG. 1) which may be configured to read any one or more sets of instructions, e.g., software, from any of the memories described herein. The instructions, when executed by a processor embedded within the DCDM 406 or within the DCDD 402, may be used to perform one or more of the methods and processes as described herein. In a particular embodiment, the instructions may reside completely, or at least partially, within the memory 106, the medium reader 112, and/or the processor 104 (see FIG. 1) during execution by the DCDD 402.

According to exemplary embodiments, the instructions, when executed, may cause a processor embedded within the DCDM 406, 506 or the DCDD 402 to perform the following: establishing a communication link between a passive database and an active database via a communication network; executing real-time syncing of data between the active database and the passive database by implementing a replication algorithm; receiving a request from an application user to generate a report corresponding to the application; implementing a batch processor, at an application level, to separate read-only operations from read and write operations associated the application; and separating or distributing database calls, at the application level, between the active database and the passive database in a manner such that the read-only operations are directed to the passive database and the read and write operations are directed to the active database in order to reduce load on the active database to generate the report. According to exemplary embodiments, the processor may be the same or similar to the processor 104 as illustrated in FIG. 1 or the processor embedded within the DCDD 202, DCDD 302, DCDD 402, and DCDM 406, 506 which is the same or similar to the processor 104.

According to exemplary embodiments, the instructions, when executed, may cause the processor 104 to further perform the following: creating a disaster recovery pair global load balancer for a new data source to enable the passive database to act as an intrusion prevention system for accessing read only operations; and establishing connection for the new data source in the passive database.

According to exemplary embodiments, the instructions, when executed, may cause the processor 104 to further perform the following: adding, at the application level, a new database connectivity uniform resource locator and database user functional identifiers to application properties.

According to exemplary embodiments, the instructions, when executed, may cause the processor 104 to further perform the following: configuring the new database connectivity uniform resource locator at the application level; and configuring the new data source at the application level for the read-only operations.

According to exemplary embodiments, the instructions, when executed, may cause the processor 104 to further perform the following: creating the active database as a primary database in an availability zone; and creating the passive database as a read replica database in the same availability zone.

According to exemplary embodiments, the instructions, when executed, may cause the processor 104 to further perform the following: creating the active database as a primary database in a first availability zone; and creating the passive database as a read replica database in a second availability zone different from the first availability zone.

According to exemplary embodiments, in implementing the replication algorithm, the instructions, when executed, may cause the processor 104 to further perform the following: loading, distributing, and filtering transactions associated with the application in real-time; and enabling migrations of data between the active database and the passive database in real-time.

According to exemplary embodiments as disclosed above in FIGS. 1-7, technical improvements effected by the instant disclosure may include a platform for implementing a platform, language, database, and cloud agnostic database calls distributing module configured to separate or distribute database calls between read write (active) and read only (passive) databases for better performance and client experience, but the disclosure is not limited thereto.

According to exemplary embodiments as disclosed above in FIGS. 1-7, technical improvements effected by the instant disclosure may include a platform for implementing a platform, language, database, and cloud agnostic database calls distributing module configured to effect the following technical improvements: results in better performance, as load of database will be segregated; active database connections would be available to cater synchronous client request; resource usability; cost optimization, if the application is heavily used and going to expand in near future, from data point of view workload separation can be applied which can save cost from procuring a new server, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for separating or distributing database calls between active and passive databases by utilizing one or more processors along with allocated memory, the method comprising:

establishing a communication link between a passive database and an active database via a communication network;
executing real-time syncing of data between the active database and the passive database by implementing a replication algorithm;
receiving a request from an application user to generate a report corresponding to the application;
implementing a batch processor, at an application level, to separate read-only operations from read and write operations associated the application;
separating or distributing database calls, at the application level, between the active database and the passive database;
directing, in response to separating or distributing database calls, the read-only operations to the passive database;
directing, in response to separating or distributing database calls, the read and write operations to the active database in order to reduce load on the active database; and
generating the report.

2. The method according to claim 1, further comprising:
creating a disaster recovery pair global load balancer for a new data source to enable the passive database to act as an intrusion prevention system for accessing read only operations; and
establishing connection for the new data source in the passive database.

3. The method according to claim 2, further comprising:
adding, at the application level, a new database connectivity uniform resource locator and database user functional identifiers to application properties.

4. The method according to claim 3, further comprising:
configuring the new database connectivity uniform resource locator at the application level; and
configuring the new data source at the application level for the read-only operations.

5. The method according to claim 1, further comprising:
creating the active database as a primary database in an availability zone; and
creating the passive database as a read replica database in the same availability zone.

6. The method according to claim 1, further comprising:
creating the active database as a primary database in a first availability zone; and
creating the passive database as a read replica database in a second availability zone different from the first availability zone.

7. The method according to claim 1, wherein in implementing the replication algorithm, the method further comprising:
loading, distributing, and filtering transactions associated with the application in real-time; and
enabling migrations of data between the active database and the passive database in real-time.

8. A system for separating or distributing database calls between active and passive databases, the system comprising:
a processor; and
a memory operatively connected to the processor via a communication interface, the memory storing computer readable instructions, when executed, causes the processor to:
establish a communication link between a passive database and an active database via a communication network;

execute real-time syncing of data between the active database and the passive database by implementing a replication algorithm;

receive a request from an application user to generate a report corresponding to the application;

implement a batch processor, at an application level, to separate read-only operations from read and write operations associated the application;

separate or distribute database calls, at the application level, between the active database and the passive database;

direct, in response to separating or distributing database calls, the read-only operations to the passive database;

direct, in response to separating or distributing database calls, the read and write operations to the active database in order to reduce load on the active database; and generate the report.

9. The system according to claim 8, wherein the processor is further configured to:

create a disaster recovery pair global load balancer for a new data source to enable the passive database to act as an intrusion prevention system for accessing read only operations; and establish connection for the new data source in the passive database.

10. The system according to claim 9, wherein the processor is further configured to:

add, at the application level, a new database connectivity uniform resource locator and database user functional identifiers to application properties.

11. The system according to claim 10, wherein the processor is further configured to:

configure the new database connectivity uniform resource locator at the application level; and configure the new data source at the application level for the read-only operations.

12. The system according to claim 8, wherein the processor is further configured to:

create the active database as a primary database in an availability zone; and create the passive database as a read replica database in the same availability zone.

13. The system according to claim 8, wherein the processor is further configured to:

create the active database as a primary database in a first availability zone; and create the passive database as a read replica database in a second availability zone different from the first availability zone.

14. The system according to claim 8, in implementing the replication algorithm, the processor is further configured to:

load, distribute, and filter transactions associated with the application in real-time; and enable migrations of data between the active database and the passive database in real-time.

15. A non-transitory computer readable medium configured to store instructions for separating or distributing database calls between active and passive databases, the instructions, when executed, cause a processor to perform the following:

establishing a communication link between a passive database and an active database via a communication network;

executing real-time syncing of data between the active database and the passive database by implementing a replication algorithm;

receiving a request from an application user to generate a report corresponding to the application;

implementing a batch processor, at an application level, to separate read-only operations from read and write operations associated the application;

separating or distributing database calls, at the application level, between the active database and the passive database;

directing, in response to separating or distributing database calls, the read-only operations to the passive database;

directing, in response to separating or distributing database calls, the read and write operations to the active database in order to reduce load on the active database; and generating the report.

16. The non-transitory computer readable medium according to claim 15, wherein the instructions, when executed, cause the processor to further perform the following:

creating a disaster recovery pair global load balancer for a new data source to enable the passive database to act as an intrusion prevention system for accessing read only operations; and establishing connection for the new data source in the passive database.

17. The non-transitory computer readable medium according to claim 16, wherein the instructions, when executed, cause the processor to further perform the following:

adding, at the application level, a new database connectivity uniform resource locator and database user functional identifiers to application properties.

18. The non-transitory computer readable medium according to claim 17, wherein the instructions, when executed, cause the processor to further perform the following:

configuring the new database connectivity uniform resource locator at the application level; and configuring the new data source at the application level for the read-only operations.

19. The non-transitory computer readable medium according to claim 15, wherein the instructions, when executed, cause the processor to further perform the following:

creating the active database as a primary database in an availability zone; and creating the passive database as a read replica database in the same availability zone.

20. The non-transitory computer readable medium according to claim 15, wherein the instructions, when executed, cause the processor to further perform the following:

creating the active database as a primary database in a first availability zone; and creating the passive database as a read replica database in a second availability zone different from the first availability zone.

* * * * *